(12) United States Patent
Wu et al.

(10) Patent No.: US 9,616,652 B2
(45) Date of Patent: Apr. 11, 2017

(54) SYSTEM FOR REMOVING TOUCH PANEL

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Fangfang Wu, Beijing (CN); Long Xia, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 153 days.

(21) Appl. No.: 14/409,178

(22) PCT Filed: May 21, 2014

(86) PCT No.: PCT/CN2014/077986
§ 371 (c)(1),
(2) Date: Dec. 18, 2014

(87) PCT Pub. No.: WO2015/058518
PCT Pub. Date: Apr. 30, 2015

(65) Prior Publication Data
US 2016/0263880 A1    Sep. 15, 2016

(30) Foreign Application Priority Data
Oct. 24, 2013 (CN) .......................... 2013 1 0508220

(51) Int. Cl.
*B32B 38/10* (2006.01)
*B32B 43/00* (2006.01)
*B32B 38/00* (2006.01)

(52) U.S. Cl.
CPC ........ *B32B 43/006* (2013.01); *B32B 38/0004* (2013.01); *B32B 38/10* (2013.01);
(Continued)

(58) Field of Classification Search
CPC . B32B 38/10; B32B 43/006; Y10T 156/1153; Y10T 156/1184; Y10T 156/1911; Y10T 156/1967
(Continued)

(56) References Cited

U.S. PATENT DOCUMENTS 7,150,804 B2 * 12/2006 Tajima ...................... G09F 7/18
                                                                   156/707
8,141,611 B2 *  3/2012 Lai ........................ B23D 49/02
                                                                   156/701
(Continued)

FOREIGN PATENT DOCUMENTS

CN          1942292       4/2007
CN       201501166 U     6/2010
(Continued)

OTHER PUBLICATIONS

Office Action issued in corresponding Chinese Application No. 201310508220.0 dated Feb. 4, 2015.
(Continued)

*Primary Examiner* — Mark A Osele
*Assistant Examiner* — Nickolas Harm
(74) *Attorney, Agent, or Firm* — BakerHostetler LLP

(57) ABSTRACT

The present disclosure provides a system for removing a touch panel from a display panel. The system includes: a carrying device on which the display panel adhered with the touch panel is placed; a heating device configured to heat an adhesive between the touch panel and the display panel; and
(Continued)

a cutting device arranged on the carrying device and configured to cut the adhesive so as to remove the touch panel from the display panel.

11 Claims, 3 Drawing Sheets

(52) U.S. Cl.
CPC .... *B32B 2457/208* (2013.01); *Y10T 156/1153* (2015.01); *Y10T 156/1184* (2015.01); *Y10T 156/1911* (2015.01); *Y10T 156/1967* (2015.01)

(58) Field of Classification Search
USPC ................ 156/711, 717, 752, 762, 924, 937
See application file for complete search history.

(56) References Cited

U.S. PATENT DOCUMENTS

| | | | | |
|---|---|---|---|---|
| 2003/0230381 | A1* | 12/2003 | Watanabe | H01J 9/52 156/250 |
| 2004/0221947 | A1 | 11/2004 | Haldner et al. | |
| 2005/0072523 | A1* | 4/2005 | Businger | B29C 63/0013 156/763 |
| 2007/0144653 | A1* | 6/2007 | Padilla | B29C 65/14 156/64 |
| 2010/0154992 | A1* | 6/2010 | Feinstein | B32B 38/0004 156/711 |
| 2010/0199818 | A1* | 8/2010 | Lee | B26D 1/547 83/16 |
| 2011/0174445 | A1* | 7/2011 | Ciliberti | H01L 21/67132 156/752 |
| 2014/0102270 | A1* | 4/2014 | Teck | B26D 3/28 83/13 |

FOREIGN PATENT DOCUMENTS

| | | |
|---|---|---|
| CN | 101898263 | 12/2010 |
| CN | 102217034 | 10/2011 |
| CN | 102236199 A | 11/2011 |
| CN | 103085116 A | 5/2013 |
| CN | 103264570 | 8/2013 |
| CN | 103365517 | 10/2013 |
| CN | 103522729 | 1/2014 |
| JP | 2004184677 | 7/2004 |
| TW | 201029817 | 8/2010 |

OTHER PUBLICATIONS

Written Opinion in PCT International Application No. PCT/CN2014/077986, dated Oct. 24, 2014.
Office Action in Chinese Patent Application No. 201310508220.0, dated Jun. 19, 2015.
Office Action in Chinese Patent Application No. 201310508220.0, dated Sep. 8, 2015.
International Search Report and Written Opinion issued in corresponding International Application No. PCT/CN2014/077986 dated Oct. 24, 2014.

* cited by examiner

SYSTEM FOR REMOVING TOUCH PANEL

CROSS-REFERENCE TO RELATED APPLICATION

This application is the U.S. national phase of PCT Application No. PCT/CN2014/077986 filed on May 21, 2014, which claims a priority of the Chinese patent application No. 201310508220.0 filed on Oct. 24, 2013, which is incorporated herein by reference in its entirety.

TECHNICAL FIELD

The present disclosure relates to the field of display technology, in particular to a system for removing a touch panel.

BACKGROUND

Touch screen, also called as touch and control screen, is now the simplest, most convenient and most natural human-computer interaction way. As a new attractive multimedia interactive device, it gives the multimedia a new look, and brings great convenience for the people's lives.

The touch screen is generally formed by adhering a touch panel onto a surface of a display panel. During the adhesion, the touch panel, after an adhesive is applied uniformly onto a surface thereof, is adhered onto the display panel. However, such an adhesion mode will result in difficult removal of the touch panel from the surface of the display panel in a subsequent analytical or reworking process, and result in damage of the touch panel or the display panel easily in a removal process.

SUMMARY

An object of the present disclosure is to provide a system for removing a touch panel, so as to remove the touch panel from a display panel without breaking the touch panel and the display panel.

In order to achieve the above-mentioned object, the present disclosure provides a system for removing a touch panel from a display panel, including:

a carrying device on which the display panel adhered with the touch panel is placed;

a heating device configured to heat an adhesive between the touch panel and the display panel; and a cutting device arranged on the carrying device and configured to cut the adhesive so as to remove the touch panel from the display panel.

To be specific, the heating device is a hot air gun capable of generating hot air at a predetermined temperature, and an air outlet of the hot air gun faces the touch panel.

Alternatively, the cutting device includes a cutting head capable of generating the predetermined temperature, and the adhesive is cut by the cutting head so as to remove the touch panel from the display panel.

Alternatively, the carrying device includes:
a platform; and
a plurality of vacuum chucks arranged on the platform and configured to secure the display panel.

Alternatively, the cutting device is secured onto a first lifting rod arranged on the platform, the hot air gun is secured onto a second lifting rod arranged on the platform, and the second lift rod is different from, or identical to, the first lifting rod.

Alternatively, the cutting head includes:
a conveyor belt capable of moving in a first direction and conveying in a second direction on the platform, the first direction being perpendicular to the second direction; and
a resistance wire arranged on a surface of the conveyor belt and capable of generating the predetermined temperature.

Alternatively, the cutting device further includes a gear-and-motor accommodating module, and the conveyor belt is driven by a gear which is driven by a motor in the gear-and-motor accommodating module.

Alternatively, a surface of the resistance wire is covered with a heat-resistant resin material.

Alternatively, the resistance wire is of an arc shape.

Alternatively, the system further includes:
a control device configured to control a temperature of the cutting head and a temperature of the hot air generated by the hot air gun.

Alternatively, the control device includes:
a first control module configured to control a movement speed and a conveyance speed of the conveyor belt.

Alternatively, the control device further includes:
a second control module configured to control a position of the hot air gun on the second lifting rod so as to control a distance between the hot air gun and the touch panel; and
a third control module configured to control a position of the cutting device on the first lifting rod so as to control a distance between the cutting device and the platform.

To be specific, the cutting head is controlled at 50° C. to 100° C. by the control device, and the hot air generated by the hot air gun is controlled at 50° C. to 100° C. by the control device.

According to the present disclosure, the system for removing the touch panel includes the cutting device and the heating device capable of heating the adhesive between the touch panel and the display panel. When the touch panel is to be removed from the display panel, the adhesive between the touch panel and the display panel is softened by the heating device, and the softened adhesive is cut by the cutting device, so as to remove the touch panel from the display panel. As a result, it is able to remove the touch panel from the display panel without breaking the touch panel and the display panel.

DETAILED DESCRIPTION

In order to make the objects, the technical solutions and the advantages of the present disclosure more apparent, the present disclosure will be described hereinafter in conjunction with the drawings and the embodiments.

In the prior art, it is difficult to remove a touch panel from a surface of a display panel, and it is easily to break the touch panel or display panel during the removal. In order to solve these drawbacks, the present disclosure provides a system for removing a touch panel from a display panel without breaking the touch panel and the display panel.

Figure 1:
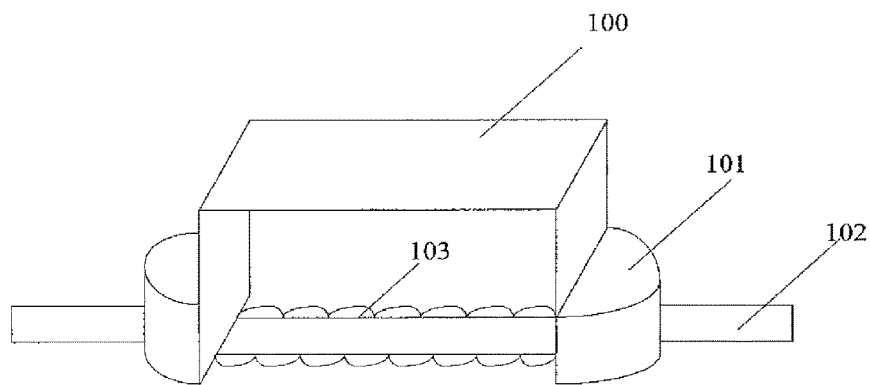
FIG. 1 is a schematic view showing a structure of a system for removing a touch panel according to one embodiment of the present disclosure.

As shown in FIG. 1, the system for removing the touch panel from the display panel includes:

a carrying device on which the display panel adhered with the touch panel is placed;

a heating device configured to heat an adhesive between the touch panel and the display panel; and a cutting device 103 arranged on the carrying device and configured to cut the adhesive so as to remove the touch panel from the display panel.

To be specific, the heating device is a hot air gun 100 capable of generating hot air at a predetermined temperature, and an air outlet of the hot air gun faces the touch panel.

According to the present disclosure, the system for removing the touch panel includes the cutting device and the heating device capable of heating the adhesive between the touch panel and the display panel. When the touch panel is to be removed from the display panel, the adhesive between the touch panel and the display panel is softened by the heating device, and the softened adhesive is cut by the cutting device, so as to remove the touch panel from the display panel. As a result, it is able to remove the touch panel from the display panel without breaking the touch panel and the display panel.

Figure 2:
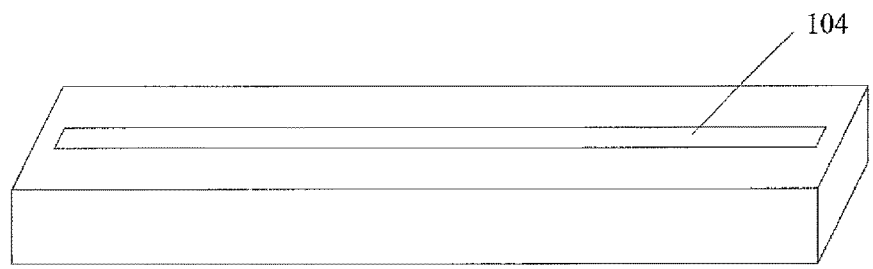
FIG. 2 is a schematic view showing a hot air gun arranged at an upper portion of a cutting device according to one embodiment of the present disclosure.

Alternatively, as shown in FIG. 2, which is a schematic view showing the hot air gun arranged at an upper portion of the cutting device, the air outlet 104 faces the touch panel to be removed during the actual operation.

Figure 5:
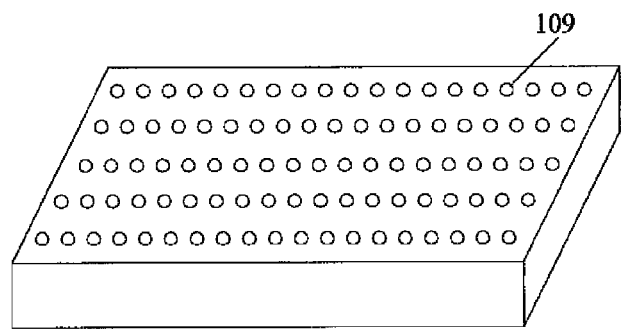
FIG. 5 is a schematic view showing a structure of a carrying device according to one embodiment of the present disclosure.

To be specific, as shown in FIG. 5, the carrying device includes:

a platform; and a plurality of vacuum chucks 109 arranged on the platform and configured to secure the display panel. Through the vacuum chucks 109, it is able to secure the display panel to be removed, thereby to facilitate the operation.

Alternatively, the cutting device is secured onto a first lifting rod arranged on the platform, and in this way, it is able to adjust a distance between the cutting device and the platform in accordance with a type and a size of a touch screen, thereby to locate a cutting head of the cutting device just between the display panel and the touch panel. The hot air gun is secured onto a second lifting rod arranged on the platform, and in this way, it is able to adjust a distance between the hot air gun and the touch screen in accordance with the type and size of the touch screen.

The second lifting rod may be different from, or identical to, the first lifting rod. When the second lifting rod is different from the first lifting rod, the second lifting rod may be secured onto the platform and the hot air gun may be immovably secured at a certain position on the second lifting rod, as long as the air outlet of the hot air gun faces the touch panel. When the second lifting rod is identical to the first lifting rod, the hot air gun may move together with the cutting device.

Figure 3:
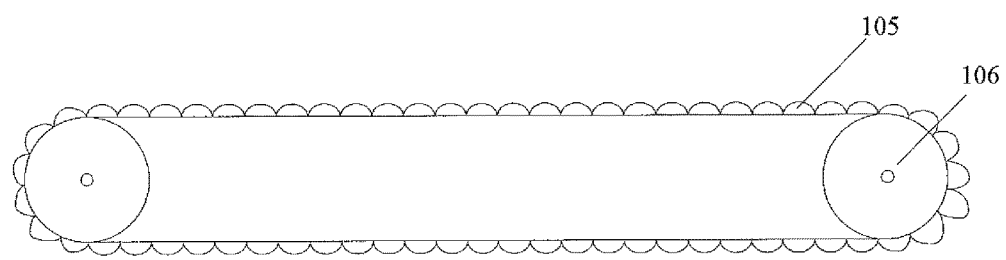
FIG. 3 is a top view of a gear arranged at a low portion of the cutting device according to one embodiment of the present disclosure.

Alternatively, as shown in FIGS. 1 and 3, the cutting device 103 may be placed by a user on the platform via a handle 102. The cutting device 103 includes the cutting head capable of generating a predetermined temperature, and the adhesive may be cut by the cutting head so as to remove the touch panel from the display panel. The cutting head of the cutting device 103 includes a conveyor belt capable of conveying in a first direction and a second direction on the platform, the first direction being perpendicular to the second direction. The first direction is just a cutting direction of the cutting device, while the second direction is just a conveyance direction of the conveyor belt. The cutting device 103 further includes a gear-and-motor accommodating device 101, and the conveyor belt is driven by a gear 106 which is driven by a motor in the gear-and-motor accommodating module 101.

The cutting head further includes a resistance wire 105 arranged on a surface of the conveyor belt and capable of generating a predetermined temperature. When the touch panel is to be removed from the display panel, the cutting device 103 is powered, and the resistance wire 105 generates a high temperature under the effect of current, and cooperates with the hot air gun above the touch panel so as to soften the cured adhesive between the touch panel and the display panel rapidly. The resistance wire 105 rotates within a horizontal plane along with the conveyor belt, so as to remove the touch panel conveniently and rapidly.

Figure 4:
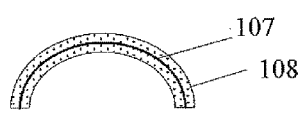
FIG. 4 is a schematic view showing an arc resistance wire arranged at a surface of a conveyor belt of the cutting device according to one embodiment of the present disclosure.

Alternatively, in order to prevent the display panel and the touch panel from being damaged during the operation when the resistance wire is of excessive surface hardness, as shown in FIG. 4, the resistance wire is designed as an arc resistance wire 107, and a layer of heat-resistant resin material 108 is coated onto a surface of the resistance wire. However, the resistance wire of the present disclosure is not limited to the arc one, and it may also be a circular, triangular, rectangular, or irregular resistance wire.

Alternatively, the system for removing the touch panel further includes control device configured to control a temperature of the cutting head and a temperature of the hot air generated by the hot air gun. To be specific, the control device may control the temperature of the cutting head and the temperature of the hot air generated by the hot air gun by controlling the current passing through the resistance wire and the hot air gun. The cutting head may be controlled at 50° C. to 100° C., while the hot air generated by the hot air gun may be controlled at 50° C. to 100° C. In the actual operation, the temperature of the cutting head and the temperature of the hot air generated by the hot air gun may also be adjusted in accordance with the touch screen at any time.

Alternatively, the control device includes a first control module configured to control a movement speed and a conveyance speed of the conveyor. The first control module may control a removal speed of the touch panel by controlling the movement speed of the conveyor belt, and control a horizontal movement speed of the resistance wire by controlling the conveyance speed of the conveyor belt.

Alternatively, the control device further includes a second control module configured to control a distance between the hot air gun and the touch panel and a third control module configured to control a distance between the cutting device and the platform. The second control module may adjust a position of the hot air gun on the second lifting rod in accordance with the type and size of the touch screen, so as to adjust the distance between the hot air gun and the touch screen. The third control module may adjust a position of the cutting device on the first lifting rod in accordance with the type and size of the touch screen, so as to adjust the distance between the cutting device and the platform, thereby to place the cutting head of the cutting device just between the display panel and the touch panel.

The system for removing the touch panel and its operation procedure will be described hereinafter in conjunction with FIG. 6.

Figure 6:
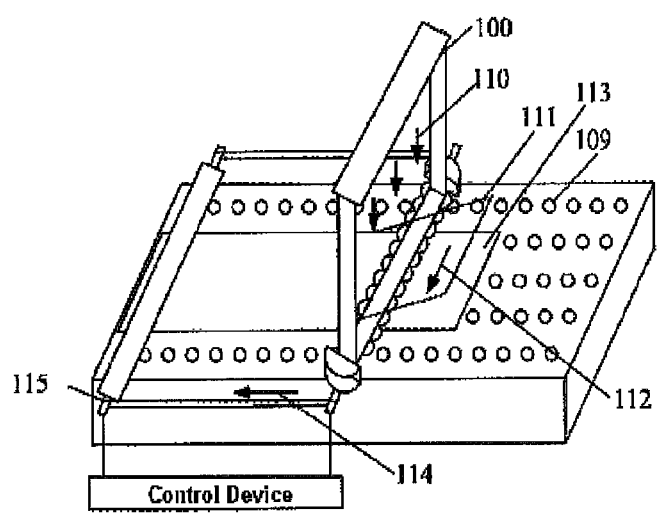
FIG. 6 is a schematic view showing an operation state of the system for removing the touch panel according to one embodiment of the present disclosure.

As shown in FIG. 6, a plurality of vacuum chucks 109 for securing the display panel are arranged on the platform, and when the touch panel 111 is to be removed from the display panel 113, the display panel 113 is secured by means of the vacuum chucks 109. The cutting device is secured onto the first lifting rod on the carrying device, and the control device may adjust the position of the cutting head by adjusting the position of the cutting device on the first lifting rod so as to place the cutting head just between the touch panel 111 and the display panel 113. The arc resistance wire is secured onto, and horizontally placed on, a surface of the conveyor belt, with its head facing outward. The hot air gun 100 is secured onto the second lifting rod on the carrier device. The second lifting rod may be different from, or identical to, the first lifting rod. The control device may adjust the position of the hot air gun 100 by adjusting the position of the hot air gun 100 on the second lifting rod, so that the air outlet of the hot air gun 100 just faces an edge position where the touch panel 111 is adhered to the display panel 113. 110 represents an air-blowing direction of the hot air gun.

During the operation of the system for removing the touch panel, the hot air gun 100 is controlled first to blow out the hot air at the predetermined temperature so as to soften the adhesive between the touch panel and the display pane. Then, the arc resistance wire is pushed into between the touch panel and the display panel. Because the arc resistance wire generates heat and cooperates with the hot air gun above the touch panel, it is able to soften the cured adhesive rapidly. In addition, the arc resistance wire rotates within a horizontal plane along with the gear, so it is able to remove the touch panel conveniently and rapidly. Arrow 112 in FIG. 6 represents a movement direction of the gear.

In addition, during the operation of the system for removing the touch panel, the control device may control the cutting speed of the cutting device by controlling a conveyance speed of a roller and conveyor module 115 including a motor, so as to control the speed for removing the touch panel from the display panel. Arrow 114 in FIG. 6 represents the movement direction, i.e., the cutting direction, of the cutting device.

According to the system for rapidly removing the touch panel from the surface of the display panel of the present disclosure, the adhesive between the touch panel and the display panel may be melt by heating, the softened adhesive may be cut by the movable arc resistance wire, and the removal speed of the touch panel may be controlled by the control device. As a result, it is able to remove the touch panel from the display panel without breaking the touch panel and the display pane.

The above are merely the preferred embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. A system for removing a touch panel from a display panel, comprising:
    a carrying device on which the display panel adhered with the touch panel is placed;
    a heating device configured to heat an adhesive between the touch panel and the display panel; and
    a cutting device arranged on the carrying device and configured to cut the adhesive so as to remove the touch panel from the display panel,
    wherein the heating device is a hot air gun capable of generating hot air at a predetermined temperature, and an air outlet of the hot air gun faces the touch panel, the carrying device comprises a platform, the cutting device is secured onto a first lifting rod arranged on the platform, the hot air gun is secured onto a second lifting rod arranged on the platform.

2. The system according to claim 1, wherein the cutting device comprises a cutting head capable of generating the predetermined temperature, and the adhesive is cut by the cutting head so as to remove the touch panel from the display panel.

3. The system according to claim 2, wherein the carrying device further comprises:
    a plurality of vacuum chucks arranged on the platform and configured to secure the display panel.

4. The system according to claim 1, wherein the cutting head comprises:
    a conveyor belt capable of moving in a first direction and conveying in a second direction on the platform, the first direction being perpendicular to the second direction; and
    a resistance wire arranged on a surface of the conveyor belt and capable of generating the predetermined temperature.

5. The system according to claim 4, wherein the cutting device further comprises a gear-and-motor accommodating module, and the conveyor belt is driven by a gear which is driven by a motor in the gear-and-motor accommodating module.

6. The system according to claim 4, wherein a surface of the resistance wire is covered with a heat-resistant resin material.

7. The system according to claim 4, wherein the resistance wire is of an arc shape.

8. The system according to claim 1, further comprising:
    a control device configured to control a temperature of the cutting head and a temperature of the hot air generated by the hot air gun.

9. The system according to claim 8, wherein the control device comprises:
    a first control module configured to control a movement speed and a conveyance speed of the conveyor belt.

10. The system according to claim 9, wherein the control device further comprises:
    a second control module configured to control a position of the hot air gun on the second lifting rod so as to control a distance between the hot air gun and the touch panel; and
    a third control module configured to control a position of the cutting device on the first lifting rod so as to control a distance between the cutting device and the platform.

11. The system according to claim 8, wherein the cutting head is controlled at 50° C. to 100° C. by the control device, and the hot air generated by the hot air gun is controlled at 50° C. to 100° C. by the control device.

* * * * *